United States Patent
Overall (10) Patent No.: US 9,329,459 B2
(45) Date of Patent: May 3, 2016

(54) CAMERA STABILIZER WITH QUICK-RELEASE STRAP MOUNT

(71) Applicant: Jeffrey Overall, Fountain Valley, CA (US)

(72) Inventor: Jeffrey Overall, Fountain Valley, CA (US)

(73) Assignee: Polar Pro Filters, Costa Mesa, CA (US)

( * ) Notice: Subject to any disclaimer, the term of this patent is extended or adjusted under 35 U.S.C. 154(b) by 0 days.

(21) Appl. No.: 14/545,343

(22) Filed: Apr. 24, 2015

(65) Prior Publication Data
US 2015/0261075 A1    Sep. 17, 2015

(51) Int. Cl.
*G03B 17/00* (2006.01)
*G03B 17/56* (2006.01)

(52) U.S. Cl.
CPC ............ *G03B 17/563* (2013.01); *G03B 17/561* (2013.01); *G03B 17/566* (2013.01)

(58) Field of Classification Search
USPC ................................ 396/421, 422; 248/187.1
See application file for complete search history.

(56) References Cited

U.S. PATENT DOCUMENTS

| | | | | |
|---|---|---|---|---|
| 2,370,611 | A * | 2/1945 | Du Mais | 294/139 |
| 5,737,657 | A | 4/1998 | Paddock et al. | |
| 6,141,034 | A * | 10/2000 | McCutchen | 348/36 |
| 6,234,690 | B1 * | 5/2001 | Lemieux | 396/419 |
| 8,727,642 | B1 * | 5/2014 | Tse et al. | 396/419 |
| 8,807,496 | B2 * | 8/2014 | Kessler et al. | 248/187.1 |

* cited by examiner

*Primary Examiner* — Clayton E Laballe
*Assistant Examiner* — Warren K Fenwick
(74) *Attorney, Agent, or Firm* — Jeffrey A. McKinney; McKinney Law Group APC (57) ABSTRACT

The present invention is generally directed to camera stabilizers with quick-release mounts and related methods. It is more specifically directed to such stablizers with quick-release mounts that are capable of being attached to straps (e.g., backpack straps), and related methods. In one aspect, the present invention provides a camera stabilizer. The camera stabilizer comprises: a grip that is attached to a first module, wherein the first module comprises a quick-release plate, and wherein a second module is removably attached to the first module, and wherein the second module comprises a camera mount and a section that allows removable introduction of camera add-ons.

9 Claims, 11 Drawing Sheets

CAMERA STABILIZER WITH QUICK-RELEASE STRAP MOUNT

FIELD OF THE INVENTION

The present invention is generally directed to camera stabilizers with quick-release mounts and related methods. It is more specifically directed to such stablizers with quick-release mounts that are capable of being attached to straps (e.g., backpack straps), and related methods.

BACKGROUND OF THE INVENTION

Certain quick-release camera mounting systems are known. For instance, U.S. Pat. No. 8,727,642, entitled "Quick Release Camera Mounting System", is allegedly directed to the following invention: "There is provided a quick-release camera mounting system for connecting a camera to an object, such as tripod, backpack strap or belt. The camera has a base. The system includes an adapter with a base that is connectable to the object. The adapter has a protrusion that operatively connects to and extends outwards from its base. The system includes a camera mount threadably connecting to the base of the camera and for connecting with the adapter. The camera mount has a locking mechanism capable of quickly releasing the adapter from the camera mount. The locking mechanism includes a centrally disposed recessed portion. The protrusion of the adapter is shaped to fit within the recessed portion and engage with the locking mechanism for selectively connecting the adapter to the camera mount." Abstract.

U.S. Pat. No. 6,234,690, entitled "Camera Quick-Release Device", is allegedly directed to the following invention: "An improved quick-release coupling for a tripod panhead and the like includes a base (1) (see FIGS. 3 & 4) and a releasable shoe (2). The base is attached to the shoe by manually depressing a locking button (5) against the force of compression spring (7), which allows locking ball (6) to retract into groove (5b) of the locking button, and then further depressing a fixing/releasing button (3) against force of a compression spring (8), so that retaining screw (4) retracts into the base and allows the shoe to be placed over the base flat area (1b). When manual pressure on the fixing/releasing button is released, the retaining screw moves outward by the force of the compression spring, and together with the stationary retaining screws (4a), engage appropriate concavities in the interior wall of the recess of the shoe. The fixing of the shoe to the base is automatically locked against accidental release when manual pressure on the locking button is released, by the action of a spring (7) against the locking button, which causes a shoulder (5c) on the locking button to force the locking ball downward in its bore (6a), and to protrude from, and thus prevent the rearward travel of, the fixing/releasing button, and thus the retaining screw. Concavities in the interior wall of the recess of the shoe are provided such that the shoe can be releasably attached to the base in any of 12 discrete and equally-spaced rotational orientations, facilitating its general ease of use as well as its adaptation to composite panoramic photography or imagery." Abstract.

U.S. Pat. No. 5,737,657, entitled "Adjustable Platform Having A Quick Release Mechanism For Use With A Camera", is allegedly directed to the following invention: "An adjustable platform is used with a camera support system which includes a camera support and a support apparatus. The adjustable platform includes a platform, a mounting plate, to which a camera is attached, and a quick release mechanism. The platform has a surface, a first downwardly innerly beveled sidewall and a second downwardly innerly beveled sidewall. The mounting plate is disposed on the platform. The first and second downwardly innerly beveled sidewalls loosely engage the mounting plate so that the mounting plate is slidably coupled to the platform. The quick release mechanism is coupled to the platform and, when the quick release mechanism engages the mounting plate, it secures the mounting plate to the platform. The adjustable platform includes a lateral adjustment mechanism and a longitudinal adjustment mechanism disposed beneath the platform and coupled thereto." Abstract.

Despite the certain quick-release camera mounting systems, there is still a need for new camera stabilizers with quick-release mounts and related methods.

SUMMARY OF THE INVENTION

In one aspect, the present invention provides a camera stabilizer. The camera stabilizer comprises: a grip, wherein the grip comprises a quick-release plate, and wherein the grip is attached to a module, and wherein the module comprises a camera mount and a section that allows removable introduction of camera add-ons.

In another aspect, the present invention provides a camera stabilizer with a quick-release strap mount. The camera stabilizer comprises: a grip, wherein the grip comprises a quick-release plate, and wherein the grip is attached to a module, and wherein the module comprises a camera mount and a section that allows removable introduction of camera add-ons, and wherein the quick-release plate is removably attached to a quick-release plate receiver on a front panel of a strap mount, and wherein the front panel of a strap mount is attached to a back panel of a strap mount, and wherein the front panel comprises a mechanism to tighten the strap mount on a strap, and wherein a fastener attached to the front panel of the strap mount provides for quick-release of the quick-release plate from the quick-release plate receiver.

In another aspect, the present invention provides a method of quickly accessing a camera with stabilizer from a strap. The method involves actuating a fastener on a device. The device comprises: a grip, wherein the grip comprises a quick-release plate, and wherein the grip is attached to a module, and wherein the module comprises a camera mount and a section that allows removable introduction of camera add-ons, and wherein the quick-release plate is removably attached to a quick-release plate receiver on a front panel of a strap mount, and wherein the front panel of a strap mount is attached to a back panel of a strap mount, and wherein the front panel comprises a mechanism to tighten the strap mount on a strap, and wherein a fastener attached to the front panel of the strap mount provides for quick-release of the quick-release plate from the quick-release plate receiver.

DETAILED DESCRIPTION OF THE INVENTION

The present invention is generally directed to camera stabilizers with quick-release mounts and related methods. It is more specifically directed to such stablizers with quick-release mounts that are capable of being attached to straps (e.g., backpack straps), and related methods. The subject stabilizers with quick-release mounts are discussed in detail in relation to the various figures below.

Figure 1:
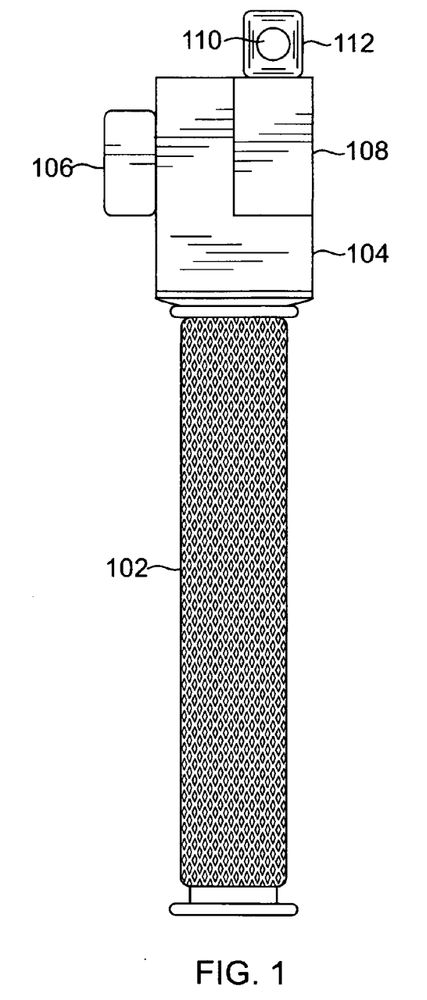
FIG. 1 shows a side view of a camera stabilizer with a quick-release plate according to the present invention.

FIG. 1 shows a side view of a camera stabilizer with a quick-release plate according to the present invention. A grip 102 is attached, either permanently or removably, to module dock 104. Module dock 104 allows removable attachment of a camera attachment module 108, typically through a set of locking channels (not shown). The camera attachment module includes a camera mount 112. Camera attachment module 108 allows inclusion of various add-ons, such as screens, lights, remote controls, LCD screens, battery modules, etc. (not shown) that can aid one in the operation of a camera. As shown, camera mount 112 includes through-hole 110, which allows attachment of the camera stabilizer to a camera using a pin-type mechanism (not shown). Module dock 104 is further attached to release plate 106, which permits quick-release attachment to a quick-release mount (not shown).

Figure 2:
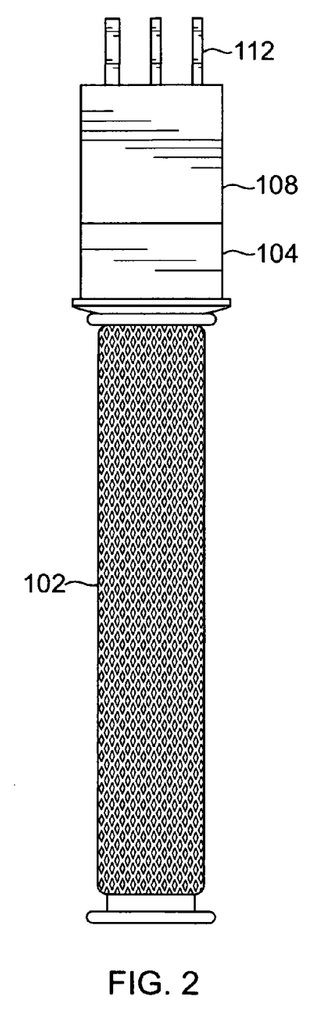
FIG. 2 shows a front view of a camera stabilizer with a quick-release plate according to the present invention.

FIG. 2 shows a front view of a camera stabilizer with a quick-release plate according to the present invention. A grip 102 is attached to module dock 104. Module dock 104 allows removable attachment of a camera attachment module 108, typically through a set of locking channels (not shown). The camera attachment module includes a camera mount 112. As shown, camera mount 112 includes one or more tabs (three tabs as shown), each having a through-hole 110 (not shown).

Figure 3:
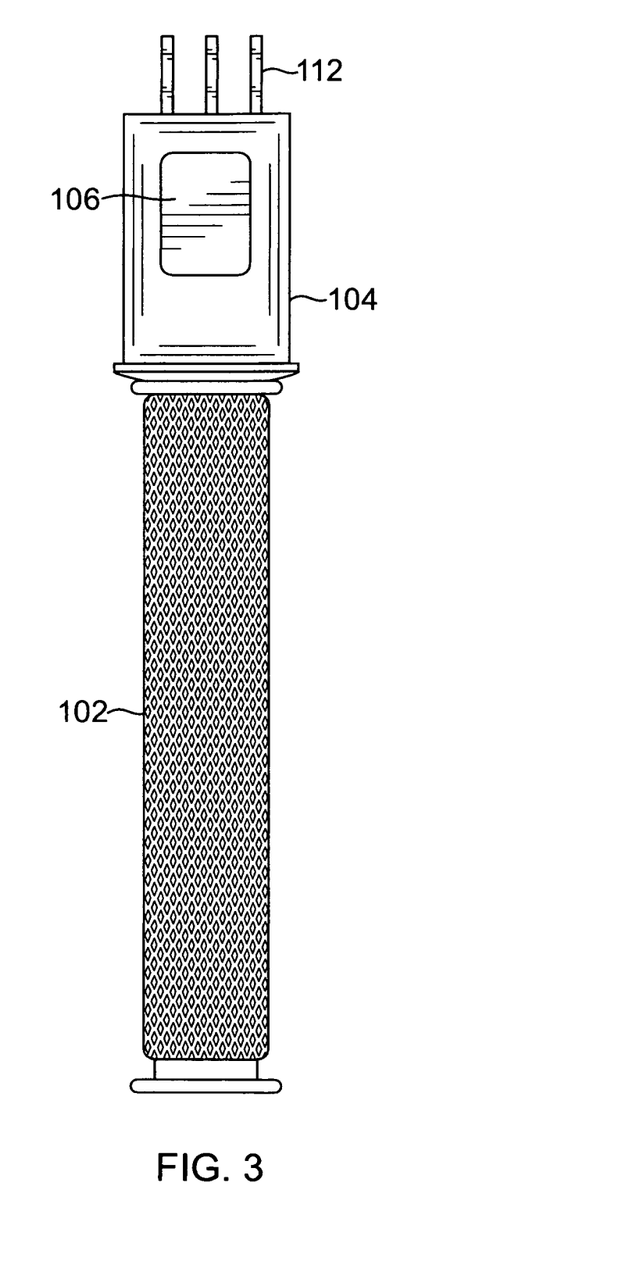
FIG. 3 shows a back view of a camera stabilizer with a quick-release plate according to the present invention.

FIG. 3 shows a back view of a camera stabilizer with a quick-release plate according to the present invention. A grip 102 is attached to module dock 104, which includes a quick-release plate 106. As shown, camera mount 112 includes one or more tabs (three tabs as shown), each having a through-hole 110 (not shown).

Figure 4:
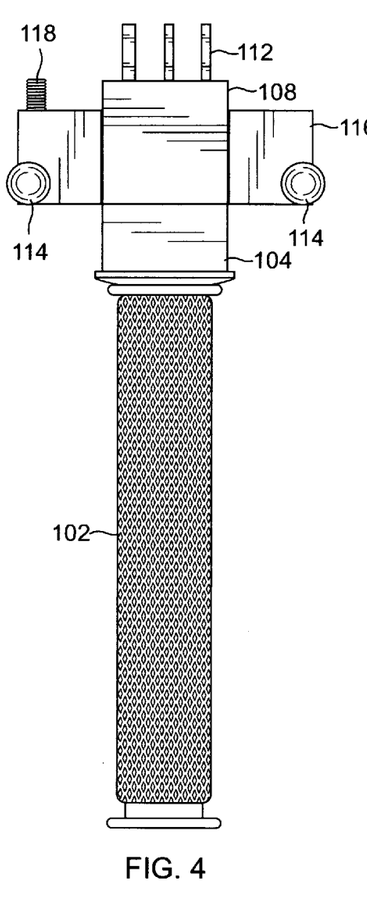
FIG. 4 shows a front view of a camera stabilizer with a quick-release strap mount according to the present invention.

FIG. 4 shows a front view of a camera stabilizer with a quick-release strap mount according to the present invention. A grip 102 is attached to module dock 104, which allows removable attachment of camera attachment module 108. The camera attachment module includes a camera mount 112. As shown, camera mount 112 includes one or more tabs (three tabs as shown), each having a through-hole 110 (not shown). Camera attachment module 108 is further attached to the front panel of strap mount 116 through connection of quick-release plate 106 to a receiver on the strap mount (not shown). Fastener 118 allows rapid detachment of quick-release plate 106 from the corresponding strap mount receiver. Control knobs 114 permit adjustment of front panel 116 relative to a back panel (not shown) such that the panels can be tightened around a strap (not shown).

Figure 5:
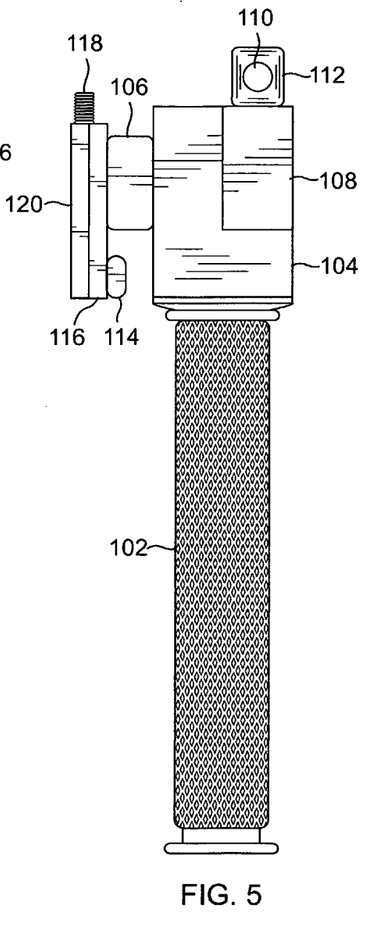
FIG. 5 shows a side view of a camera stabilizer with a quick-release strap mount according to the present invention.

FIG. 5 shows a side view of a camera stabilizer with a quick-release strap mount according to the present invention. A grip 102 is attached to module dock 104, which allows removable attachment of camera attachment module 108. The camera attachment module includes camera mount 112. As shown, camera mount 112 includes through-hole 110. Module dock 104 is further attached to release plate 106, which is connected to a receiver (not shown) on the front panel of the strap mount 116. Front panel 116 is connected to the back panel of the strap mount 120, as well as control knob 114 and fastener 118.

Figure 6:
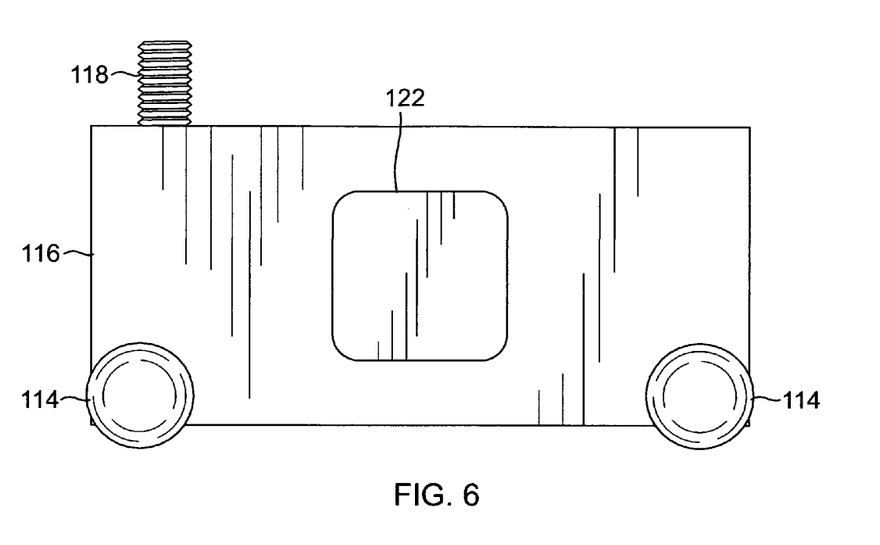
FIG. 6 shows a front view of a quick-release strap mount according to the present invention.

FIG. 6 shows a front view of a quick-release strap mount according to the present invention. The front panel of the strap mount 116 includes a release plate receiver 122, for attachment to release plate 106 (not shown) of camera stabilizer 100 (not shown), and control knobs 114. It is further attached to fastener 118.

Figure 7:
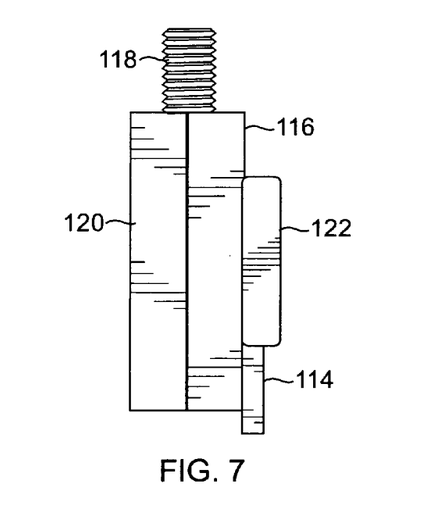
FIG. 7 shows a side view of a quick-release strap mount according to the present invention.

FIG. 7 shows a side view of a quick-release strap mount according to the present invention. The front panel of the strap mount 116 includes a release plate receiver 122 and a control knob 114. It is further attached to the back panel of the strap mount 120 and fastener 118.

Figure 8:
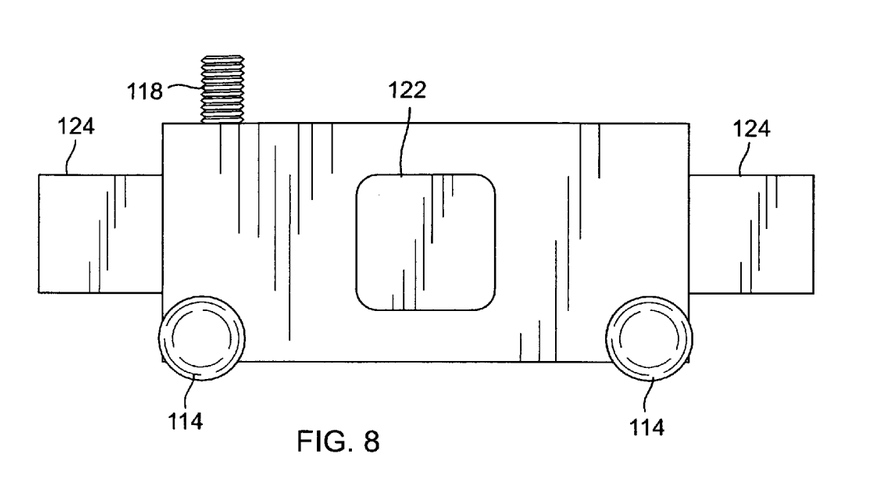
FIG. 8 shows a front view of a quick-release strap mount according to the present invention with an included strap.

FIG. 8 shows a front view of a quick-release strap mount according to the present invention with an included strap. The front panel of the strap mount 116 includes a release plate receiver 122, for attachment to release plate 106 (not shown) of camera stabilizer 100 (not shown), and control knobs 114. It is further attached to fastener 118. Strap 124 fits between the front panel of the strap mount 116 and the back panel of the strap mount 120 (not shown).

Figure 9:
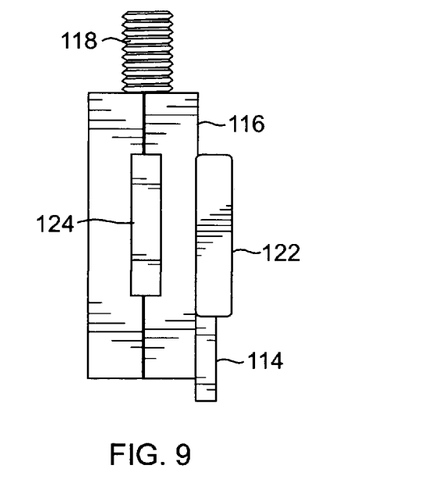
FIG. 9 shows a side view of a quick-release strap mount according to the present invention with an included strap.

FIG. 9 shows a side view of a quick-release strap mount according to the present invention with an included strap. The front panel of the strap mount 116 includes a release plate receiver 122 and a control knob 114. It is further attached to the back panel of the strap mount 120 and fastener 118. Strap 124 fits between the front panel of the strap mount 116 and the back panel of the strap mount 120.

Figure 10:
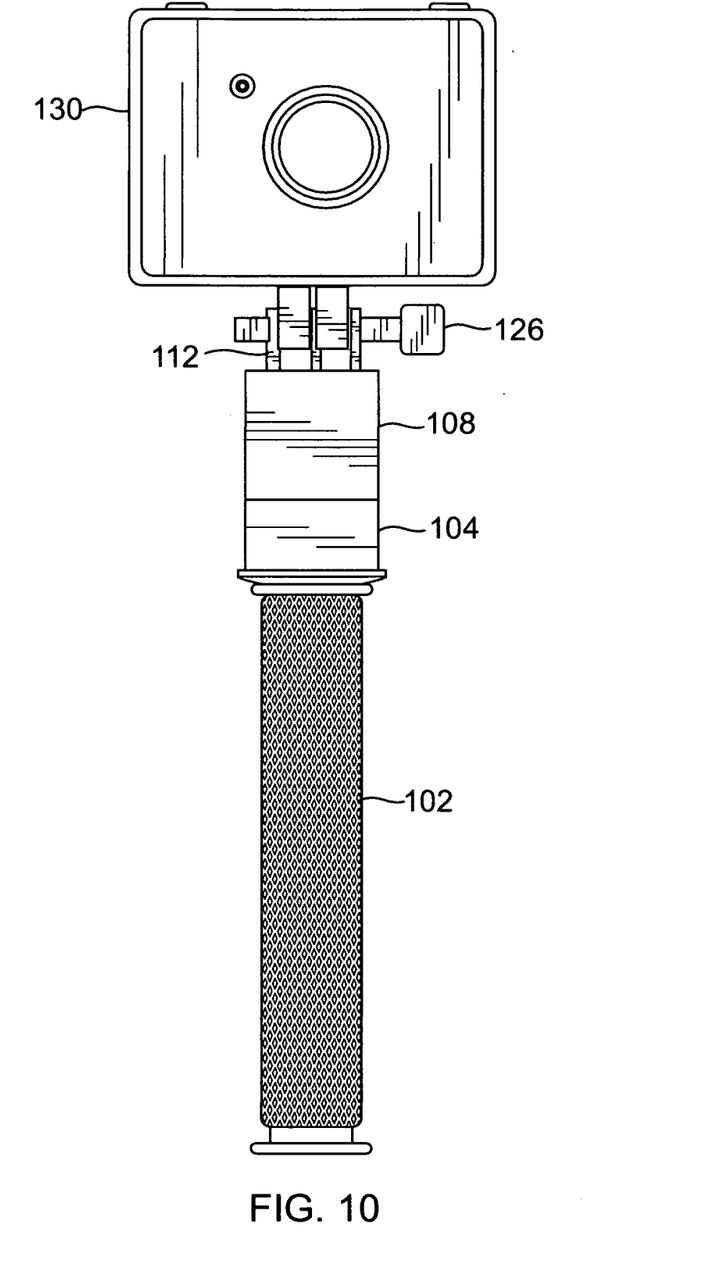
FIG. 10 shows a front view of a camera stabilizer with a quick-release plate according to the present invention with an included camera.

FIG. 10 shows a front view of a camera stabilizer with a quick-release plate according to the present invention with an included camera. Grip 102 is attached to module dock 104, which is removably attached to camera attachment module 108. The camera attachment module includes camera mount 112, which has one or more tabs (three tabs as shown). Camera 130 is attached to camera mount 112 through use of camera attachment mechanism 126, which, as shown, fits in pin-like fashion in through-holes of the tabs of camera mount 112 and camera attachment portion 128.

Figure 11:
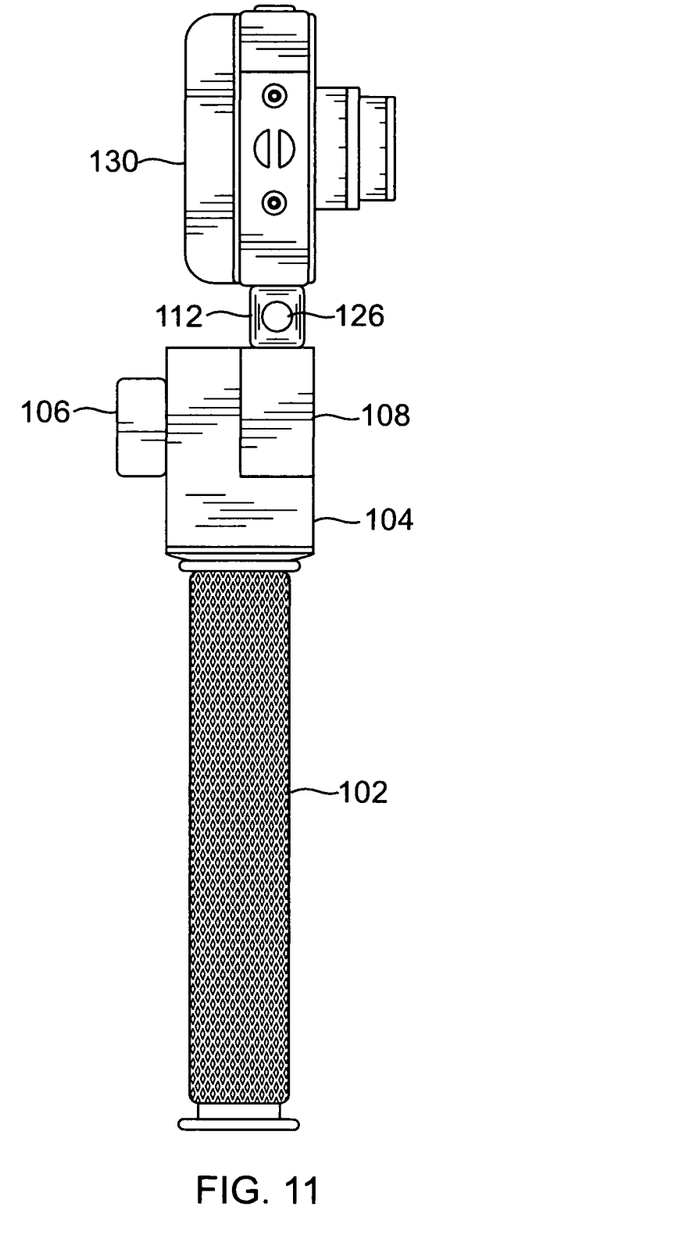
FIG. 11 shows a side view of a camera stabilizer with a quick-release plate according to the present invention with an included camera.

FIG. 11 shows a side view of a camera stabilizer with a quick-release plate according to the present invention with an included camera. Grip 102 is attached to module dock 104, which is removably connected to camera attachment module 108. Camera attachment module 108 includes camera mount

112. As shown, camera 130 is attached to camera mount 112 using a pin-type, camera attachment mechanism 126. Module dock 104 is further attached to release plate 106.

Figure 12:
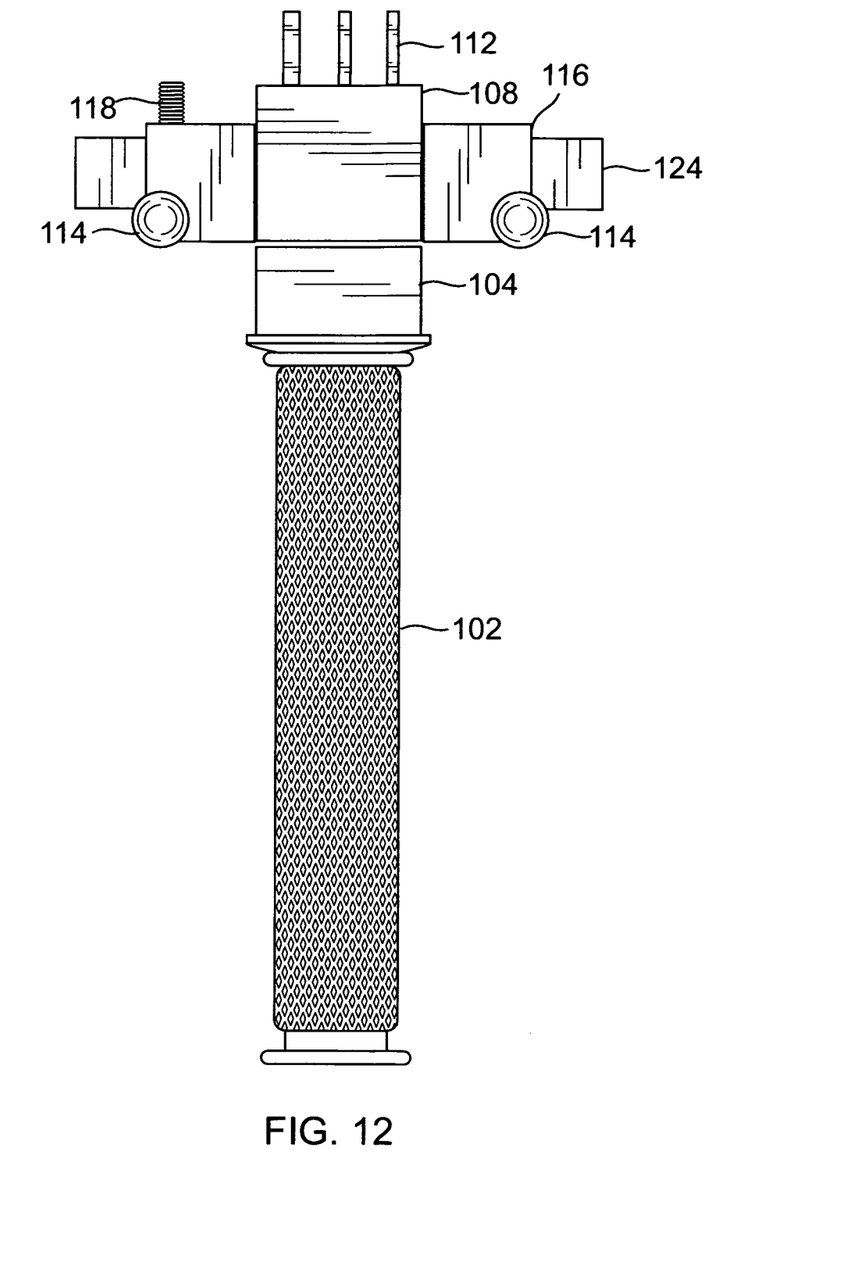
FIG. 12 shows a front view of a camera stabilizer with a quick-release strap mount according to the present invention with an included strap.

FIG. 12 shows a front view of a camera stabilizer with a quick-release strap mount according to the present invention with an included strap. Grip 102 is attached to module dock 104, which allows removable attachment of camera attachment module 108. Camera attachment module 108 includes camera mount 112. As shown, camera mount 112 includes one or more tabs (three tabs as shown), each having a through-hole 110 (not shown). Camera attachment module 108 is further attached to the front panel of strap mount 116 through connection of quick-release plate 106 to a receiver on the strap mount (not shown). Fastener 118 allows rapid detachment of quick-release plate 106 from the corresponding strap mount receiver. Control knobs 114 permit adjustment of front panel 116 relative to a back panel (not shown) such that the panels can be tightened around strap 124.

Figure 13:
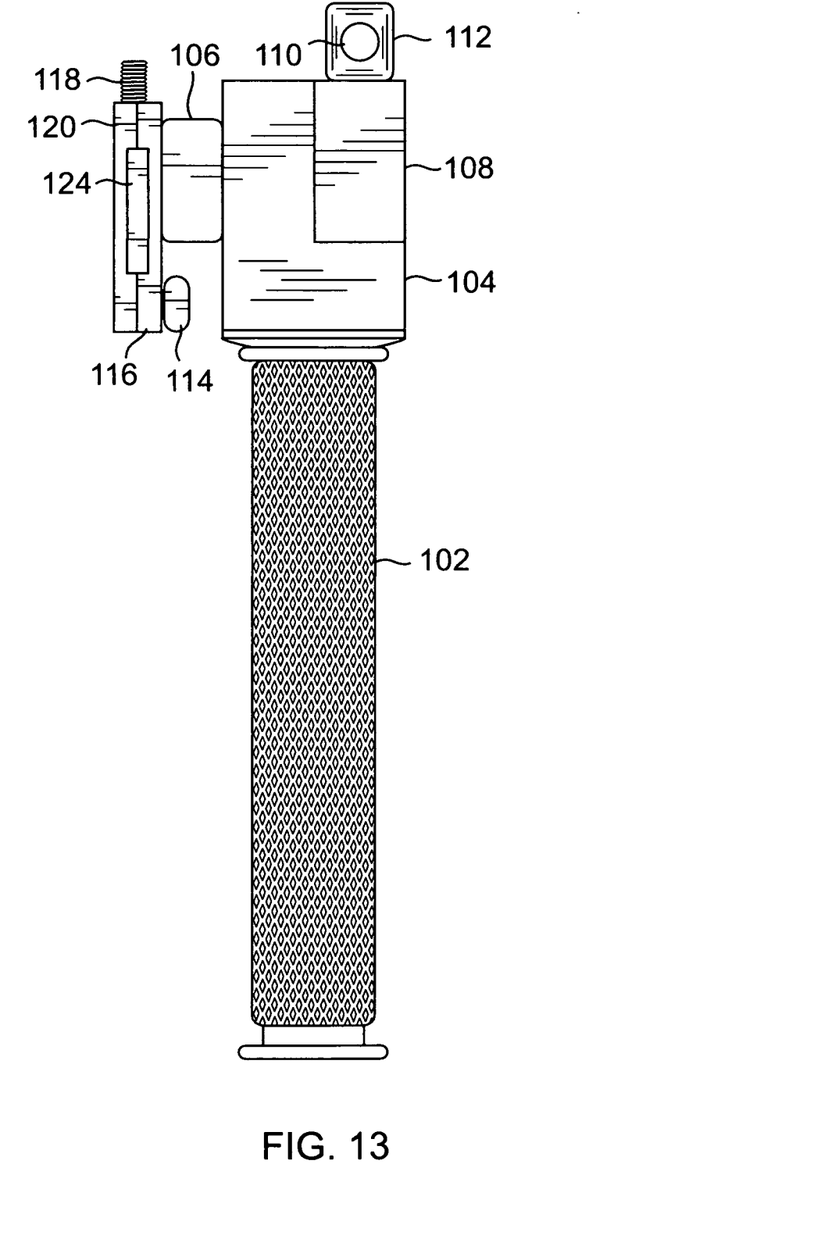
FIG. 13 shows a side view of a camera stabilizer with a quick-release strap mount according to the present invention with an included strap.

FIG. 13 shows a side view of a camera stabilizer with a quick-release strap mount according to the present invention with an included strap. Grip 102 is attached to module dock 104, which allows removable attachment of camera attachment module 108. Camera attachment module 108 includes camera mount 112. As shown, camera mount 112 includes through-hole 110. Module dock 104 is further attached to release plate 106, which is connected to a receiver (not shown) on the front panel of the strap mount 116. Front panel 116 is connected to the back panel of the strap mount 120, as well as control knob 114 and fastener 118. Strap 124 is situated between front panel 116 and back panel 120.

Figure 14:
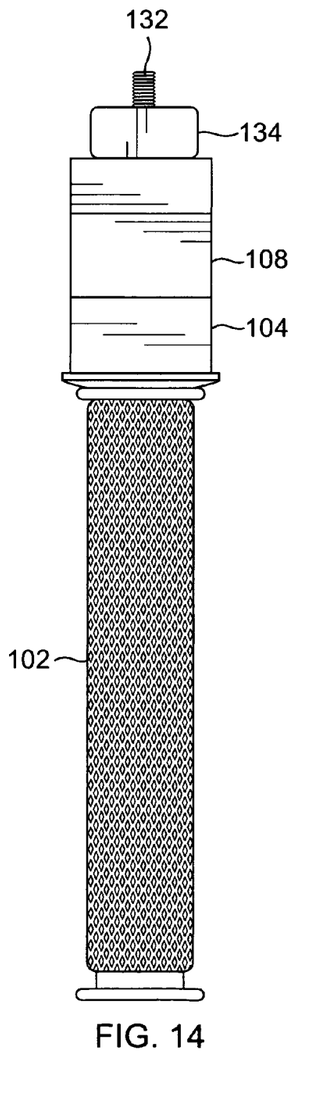
FIG. 14 shows a front view of a camera stabilizer with a quick-release plate according to the present invention, where the camera mount includes a male tripod screw.

FIG. 14 shows a front view of a camera stabilizer with a quick-release plate according to the present invention, where the camera mount includes a male tripod screw. A grip 102 is attached to module dock 104. Module dock 104 allows removable attachment of a camera attachment module 108, typically through a set of locking channels (not shown). The camera attachment module 108 includes a camera mount comprising a screw mount 132 and a screw platform 134.

Figure 15:
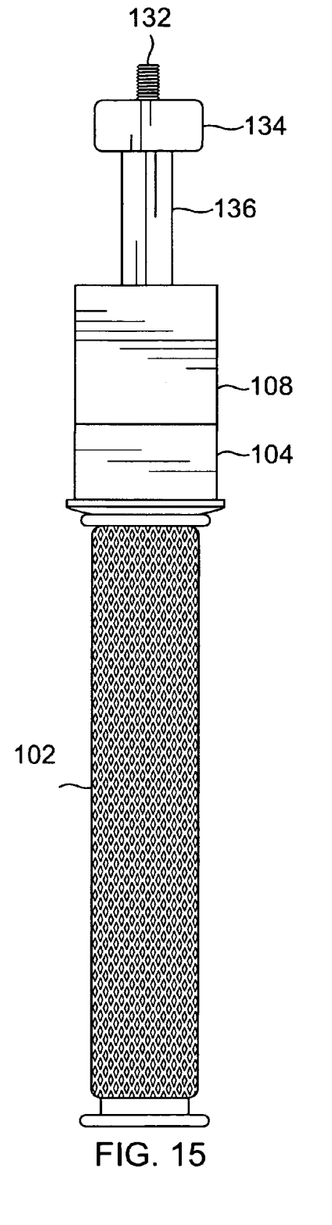
FIG. 15 shows a front view of a camera stabilizer with a quick-release plate according to the present invention, where there is an extension piece between the camera attachment module and the camera mount.

FIG. 15 shows a front view of a camera stabilizer with a quick-release plate according to the present invention, where there is an extension piece between the camera attachment module and the camera mount. A grip 102 is attached to module dock 104. Module dock 104 allows removable attachment of a camera attachment module 108, typically through a set of locking channels (not shown). The camera attachment module 108 includes a camera mount comprising a screw mount 132 and a screw platform 134. An extension piece 136 connects camera attachment 108 and screw platform 134.

Figure 16:
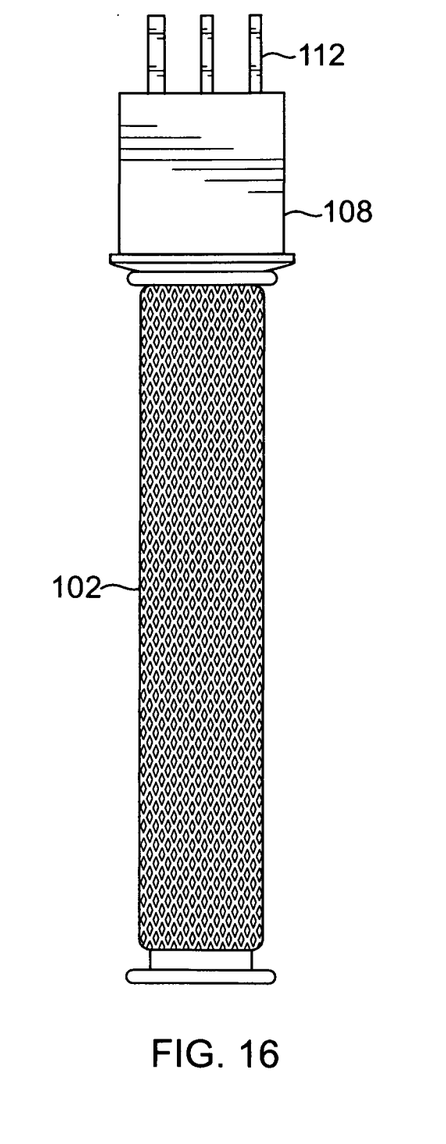
FIG. 16 shows a front view of a camera stabilizer with a quick-release plate according to the present invention, where a module dock is incorporated into a grip.

FIG. 16 shows a front view of a camera stabilizer with a quick-release plate according to the present invention, where a module dock is incorporated into a grip. A grip 102 is attached to camera attachment module 108. Grip 102 allows removable attachment of a camera attachment module 108, typically through a set of locking channels (not shown). The camera attachment module includes a camera mount 112. As shown, camera mount 112 includes one or more tabs (three tabs as shown), each having a through-hole 110 (not shown).

The camera stabilizers with quick-release mounts of the present invention permit a camera user, typically a sports action camera user, to quickly access a camera including a stabilizer. The device can, for instance, be attached to a strap on a backpack. Actuation of the fastener, which releases the quick-release mount from the release plate receiver, allows one to capture an image in a manner of seconds.

The foregoing accordingly gives rise to at least the following method:

A method of quickly accessing a camera with stabilizer from a strap, wherein the method comprises actuating a fastener on a device comprising: a grip, wherein the grip comprises a quick-release plate, and wherein the grip is attached to a module, and wherein the module comprises a camera mount and a section that allows removable introduction of camera add-ons, and wherein the quick-release plate is removably attached to a quick-release plate receiver on a front panel of a strap mount, and wherein the front panel of a strap mount is attached to a back panel of a strap mount, and wherein the front panel comprises a mechanism to tighten the strap mount on a strap, and wherein a fastener attached to the front panel of the strap mount provides for quick-release of the quick-release plate from the quick-release plate receiver.

LIST OF FIGURE ELEMENTS

100—Camera stabilizer with quick-release strap mount
102—Stabilizer grip
104—Module dock
106—Release plate
108—Camera attachment module
110—Through hole
112—Camera mount
114—Control knob
116—Front panel of strap mount
118—Fastener
120—Back panel of strap mount
122—Release plate receiver
124—Strap
126—Camera attachment mechanism
128—Camera attachment portion
130—Camera
132—Screw camera mount
134—Screw platform
136—Extension piece

The invention claimed is:

1. A camera stabilizer, wherein the camera stabilizer comprises: a grip, wherein the grip comprises a quick-release plate, and wherein the grip is attached to a module, and wherein the module comprises a camera mount and a section that allows removable introduction of camera add-ons wherein the camera mount comprises one or more tabs, each tab having a through-hole.

2. The camera stabilizer according to claim 1, wherein the module is removably attached to the grip.

3. The camera stabilizer according to claim 1, wherein the module is attached to a module dock that is connected to the grip.

4. A camera stabilizer, wherein the camera stabilizer comprises: a grip, wherein the grip comprises a quick-release plate, and wherein the grip is attached to a module, and wherein the module comprises a camera mount and a section that allows removable introduction of camera add-ons, and wherein the quick-release plate is removably attached to a quick-release plate receiver on a front panel of a strap mount, and wherein the front panel of a strap mount is attached to a back panel of a strap mount, and wherein the front panel comprises a mechanism to tighten the strap mount on a strap, and wherein a fastener attached to the front panel of the strap mount provides for quick-release of the quick-release plate from the quick-release plate receiver, wherein the camera mount comprises one or more tabs, each tab having a through-hole.

5. The camera stabilizer according to claim 4, wherein the module is removably attached to the grip.

6. The camera stabilizer according to claim 4, wherein the module is attached to a module dock that is connected to the grip.

7. A camera stabilizer, wherein the camera stabilizer comprises: a grip, wherein the grip comprises a quick-release plate, and wherein the grip is attached to a module, and wherein the module comprises a camera mount and a section that allows removable introduction of camera add-ons, and wherein the quick-release plate is removably attached to a quick-release plate receiver on a front panel of a strap mount, and wherein the front panel of a strap mount is attached to a back panel of a strap mount, and wherein the front panel comprises a mechanism to tighten the strap mount on a strap, and wherein a fastener attached to the front panel of the strap mount provides for quick-release of the quick-release plate from the quick-release plate receiver, wherein the strap-tightening mechanism is a knob that tightens on a screw mechanism.

8. The camera stabilizer according to claim 7, wherein the module is removably attached to the grip.

9. The camera stabilizer according to claim 7, wherein the module is attached to a module dock that is connected to the grip.

* * * * *